Jan. 12, 1971  W. D. CAWLEY  3,554,063
PNEUMATIC-MECHANICAL LINEAR INDEX SYSTEM
Filed Sept. 12, 1968  6 Sheets-Sheet 1

Wesley D. Cawley
INVENTOR.

BY James F. Weiler
William A. Stout
Dudley R. Dobie, Jr.
Henry W. Hope
ATTORNEYS

Wesley D. Cawley
INVENTOR.

Fig. 11

United States Patent Office 3,554,063
Patented Jan. 12, 1971

3,554,063
PNEUMATIC-MECHANICAL LINEAR INDEX SYSTEM
Wesley D. Cawley, 721 Ave. A,
Port Neches, Tex. 77651
Filed Sept. 12, 1968, Ser. No. 759,362
Int. Cl. B23b 39/06
U.S. Cl. 77—64    22 Claims

ABSTRACT OF THE DISCLOSURE

The present invention utilizes a primary cylinder to move a work table a distance predetermined by the positioning of limit valves attached to the table. The primary cylinder utilizes clamping means connected to its piston rod to grip a stationary, but rotatable, lead screw to push the table the predetermined distance. A secondary cylinder acts by means of a rack to rotate the lead screw a selected amount, causing the table to translate along the lead screw an additional, but relatively minute distance. Means are also provided to lock the table securely in a stationary position between indexing movements and to manually adjust the table.

BACKGROUND OF THE PRESENT INVENTION

It is quite often necessary to perform a large number of repeated machine operations on a single work piece at regular and constant spaces. One example of this is the manufacture of tube sheets or head plates for heat exchangers. Each of these may require as many as 1000 to 1500 holes placed in them spaced equal distance from each other and along straight lines. This manufacturing process requires the following steps (a) laying out of the hole locations (b) punching (c) center drilling (d) drilling (e) reaming and (f) grooving. Each of the above steps repeated 1000 to 1500 times, obviously results in a great amount of set-up time.

Efforts have, accordingly, been made to develop automated machinery which will automatically index the work piece. The result has been rather sophisticated and complex machines that are tape controlled, thus requiring that they be programmed for each job. These types of machines bring about a very large initial investment that many machinists and shops cannot afford or whose work loads will not justify such an expenditure. Additional expense is incurred by the fact that such machines require operators specially trained in their use. Due to their complexity, there is also the increased possibility of failure of some part. This, along with the general complex nature of these machines, brings about increased maintenance and repair cost.

Furthermore, these machines are quite often not sufficient to do all of the jobs necessary. The example of the tube sheet given above requires heavy drilling, and accordingly, somewhat heavy-duty equipment. Due to the high cost of these machines, their owners often will not risk them on such heavy work. Thus, in the tube sheet job above, they may be used through step (c), i.e., the center drilling, and then the work transferred to a large radial drill to complete the operations. An additional problem is that to manufacture such high complex machines designed to handle such heavy work increases their cost even further.

SUMMARY OF THE PRESENT INVENTION

The present invention is directed to the automatic indexing of a work table for controlled and repeated intervals, and more particularly, is directed to the utilization of a pneumatic-mechanical linear index system on such a work table which, when actuated, moves the work table linearly a predetermined distance and which movement can be repeated or reversed as desired.

The present invention overcomes the disadvantages listed above by providing a mechanical system which is pneumatically or hydraulically actuated and which is comprised basically of a work table slidably mounted on a frame, primary cylinder to provide relatively rough indexing of the table and a secondary cylinder to provide fine indexing.

The frame rotatably supports a lead screw and the table carries a primary cylinder, attached to the piston rod of which is attached indexing clamp means for movement with the piston rod. The pneumatic control system utilized herein causes the indexing clamp means to securely clamp the lead screw which is stationary except for its rotative movement. Actuation of the primary cylinder causes the cylinder and attached work table to move, rather than the piston rod, due to the fact that the indexing clamp means fixed to the piston rod is fixedly clamped to the stationary lead screw.

Limit valves are connected to the table and are utilized to reverse the action of the pneumatic control system upon contact with the primary cylinder piston rod as the table moves relative to the limit valves. Stationary clamp means fixedly secured to the work table provides a secure locking of the table between indexing steps.

Fine adjustment is accomplished due to the fact that both clamp means threadingly engage the lead screw when clamped thereabout so that the lead screw can be rotated. Due to the threaded connection, rotation of the lead screw causes linear movement or translation of the clamping means that is clamped thereabout. Accordingly, this once again results in movement of the work table. Secondary cylinder means connected to a rack is utilized to cooperate with a gear on the lead screw to provide this rotation and fine indexing. Locking means are also provided for this gear, as well as means to insure that the rack does not contact the gear during the return stroke of the secondary cylinder, thereby preventing any undesired rotation of the screw.

It is, therefore, an object of the present invention to provide a relatively simple indexing apparatus for a work table which will repeatedly index the table for predetermined distances.

Another object of the present invention is to provide such indexing apparatus which is reliable, provides low maintenance costs and which will be relatively simple and easy for an operator to use.

Still another object is to provide such an indexing system which utilizes a lead screw primarily as a pull bar and which coacts with a primary cylinder to provide the rough indexing of the table.

Still another object is to provide fine indexing means by the utilization of secondary cylinder means actuating a rack to rotate the lead screw, whereby the table will translate along the length of the lead screw for selected distances.

Still another object of the present invention is to provide pneumatic control means for the actuation of the various components of the present invention whereby control may be constantly maintained by the operator, and whereby the actuation of the components may be reversed so that the machine will index in either direction along a linear path of travel.

Another object of the present invention is to provide such indexing apparatus which may be adapted to a machine or to an attachment for the machine.

Still another object is to provide adjustable stop means for the indexing apparatus, whereby the distances indexed can be accurately and readily controlled.

Another object is to provide such pneumatic-mechanical indexing means which will be economical to manufacture and use, and which will provide for economic and reliable operation partially due to its relatively simple design which provides for greater dependability.

Other and further objects, features and advantages will be apparent from the following description of a presently preferred embodiment of the invention given for the purpose of disclosure when taken in conjunction with the accompanying drawings.

BRIEF DESCRIPTION OF THE DRAWINGS

In the drawings, like character references designate like parts in each of the several views, which views are as follows.

BRIEF DESCRIPTION OF THE PREFERRED EMBODIMENT

For purposes of description, the present invention will be described as applied to an attachment for a radial drill press. It should, however, be understood that the present invention may be adapted for any machine, or attachment therefor, requiring such indexing as is herein provided.

Figure 1:
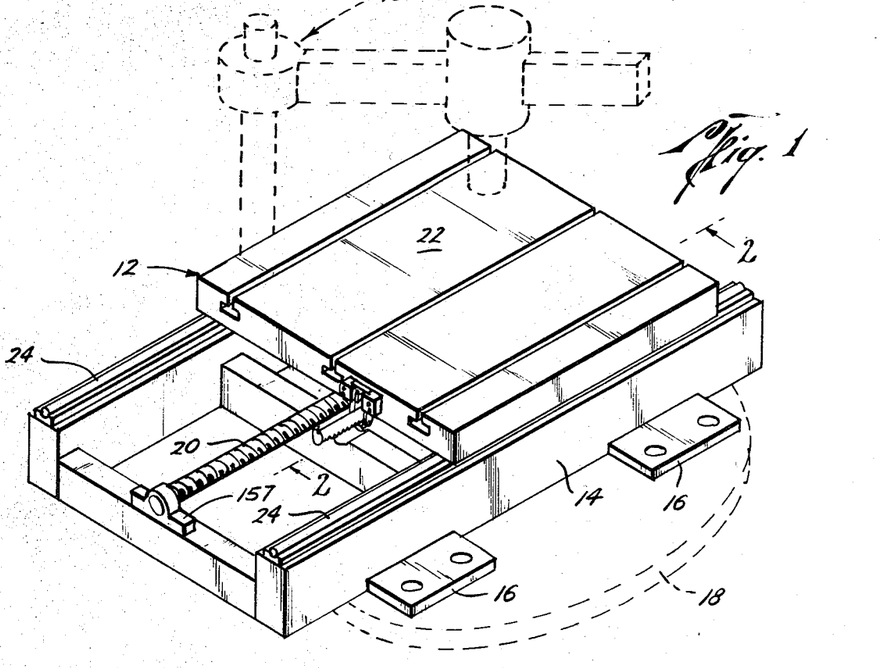
FIG. 1 is an isometric view of the present invention utilized as an attachment for a drill press which is shown in broken lines.

Turning now to FIG. 1, the present invention is shown as used in an attachment for a radial drill press, which drill press is shown in broken lines and is generally indicated by the numeral 10. The attachment itself is indicated generally by the numeral 12 and is made up essentially of a frame 14 mounted to which are flanges 16 used to connect the attachment to the drill press table 18. Extending the length of the frame 14 is the lead screw 20 which is rotatably mounted on the frame. Slidably mounted thereon is the work table 22 which slides along the ways 24.

Figures 4, 5:
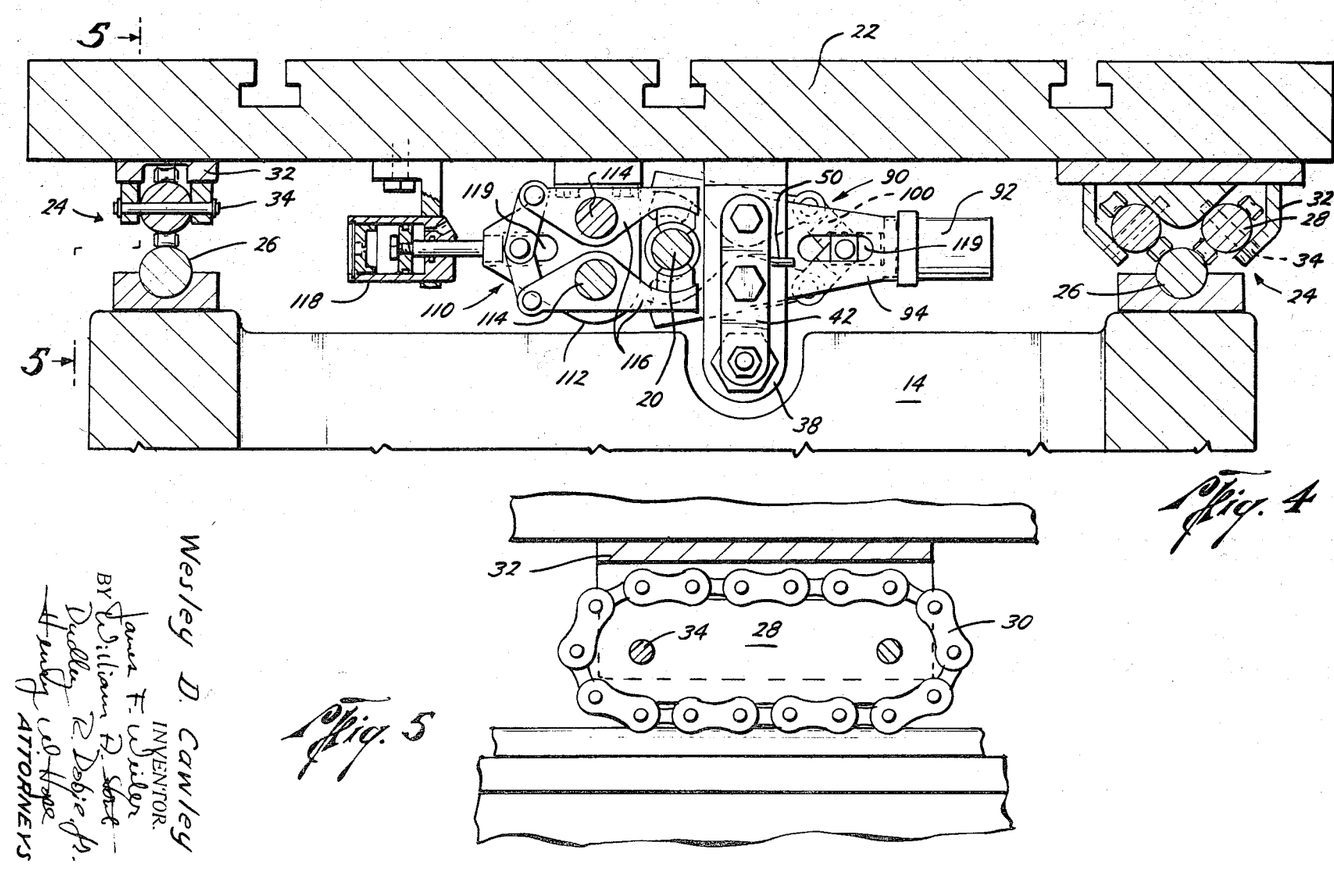
FIG. 4 is an end view in section, of the primary indexing apparatus, taken along section lines 4—4 of FIG. 2.
FIG. 5 is a side view of one of the ways utilized on the present embodiment and taken along lines 5—5 of FIG. 4.

Turning now to the ways upon which the table moves, they are more clearly shown in FIGS. 4 and 5. These particular ways are Thompson Linear Roller Ways and are comprised generally of the lower way 26 comprised of hardened steel, and an upper, elongate member 28 having a roller chain 30 mounted thereabout. The elongate member 28 is secured to the table brackets 32 by means of pins 34. Movement of the table is accomplished by the movement of chain 30 about the elongated member 28. The arrangement of the right-hand way as viewed in FIG. 4 is basically the same as that of the left-hand way, but two roller members are disposed at angles to each other to prevent lateral movement by the table.

It should be understood, however, that the particular type of roller means used on the present invention may be changed as desired, and the present invention is not limited to the use of any particular way, rollers etc.

Figure 2:
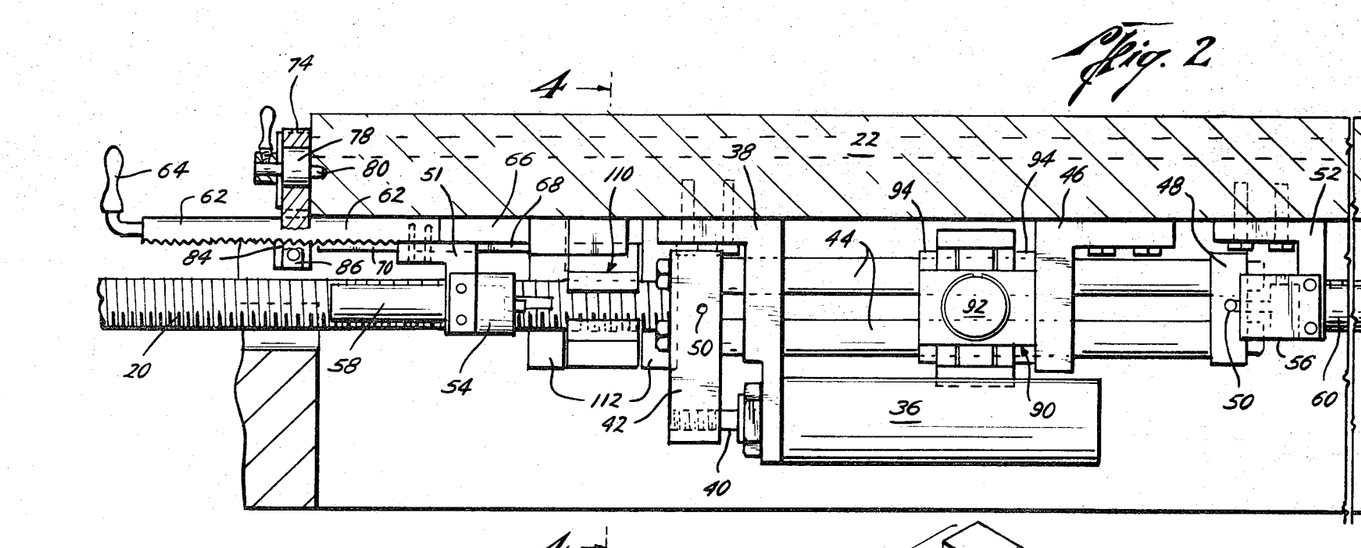
FIG. 2 is a side view, partially in section, of the primary indexing apparatus taken along section lines 2—2 of FIG. 1.

Referring now to FIGS. 1, 2 and 4, the primary indexing system will be described. The movement for the primary system is supplied by the primary cylinder 36 which is secured to the table by the angle bracket 38. The piston rod 40 of the cylinder 36 is connected by means of the plate 42 to two rods 44. These rods 44 are slidably supported from the table by means of the angle bracket 38 and bracket 46. A plate 48 connects the rods 44 at their end opposite the plate 42. Pins 50 extend outwardly from each of the plates 42 and 48. As can best be seen in FIG. 4, the frame 14 has a cut out portion in its crossmembers to allow passage of the primary cylinder 36 and its piston rod means.

Two angle brackets 51 and 52 depend from the table 22 and carry on their near side, as viewed in FIG. 2, limit valves or microswitches 54 on the left-hand side, and 56 on the right-hand side. Also mounted on the angle brackets 51 and 52 with valves 54 and 56 are shock absorbers 58 and 60, respectively. Any suitable shocks will do here, but those utilized in the present embodiment are "Cushioneers," Model 2002-31-1/2, manufactured by Deschner Company of Inglewood, California.

The bracket 52 is fixedly secured to the table 22, whereas the bracket 51 is attached to the elongate rod 62. On the outermost end of this rod 62 is a handle 64, and its underside is threaded with threads equal in pitch to those of the lead screw. The rod 62 is slidable within a recess 66 and is retained therein by means of opposed flanges 68, only one of which is shown in FIG. 2. These opposed flanges 68 define a slot 70 through which the angle bracket 51 extends and is connected to the rod 62. This rod 62 is for adjustment of the position of the angle bracket 51 and, in turn, the limit valve 54 so as to vary the distance that the piston rod plate 42 moves before it contacts this valve 54.

Figure 3:
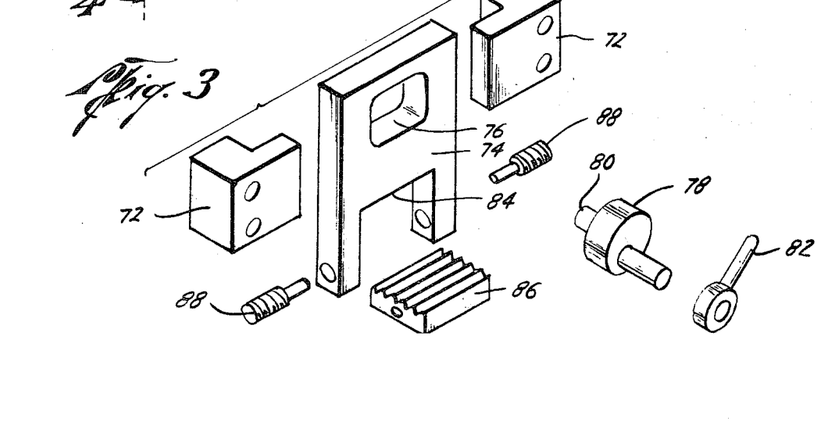
FIG. 3 is an exploded perspective view of the cam apparatus used to lock the adjustable limit valve.

To secure the rod 62 in its selected position, the cam arrangement shown in FIGS. 1 and 2 and more fully in FIG. 3 is used. This apparatus is comprised of two L-shaped brackets 72 that are secured to the table by any suitable means, such as bolting. These brackets define a vertical slot within which the plate 74 slides. This plate 74 has an opening 76 to receive the cam member 78. The cam member 78 is pivoted about an eccentric axis 80 and is manipulated by a handle 82. The lower part of the plate has an open-ended recess 84, in the lower part of which is secured the toothed plate 86 by the pins 88.

By rotating the cam member 78, the plate 74 is raised or lowered along with the plate 86. By lowering the plate 86, the rod 62 is free for adjustment to the desired position. The plate 86 may then be raised to contact the lower toothed portion of the adjustment rod 62, and urge the rod against the underside of the table 22. This securely locks the adjustment rod, the limit valve 54 and shock absorber 58 in place. It should be noted that any prior art means of adjustment for the limit valve may be used.

Figure 6:
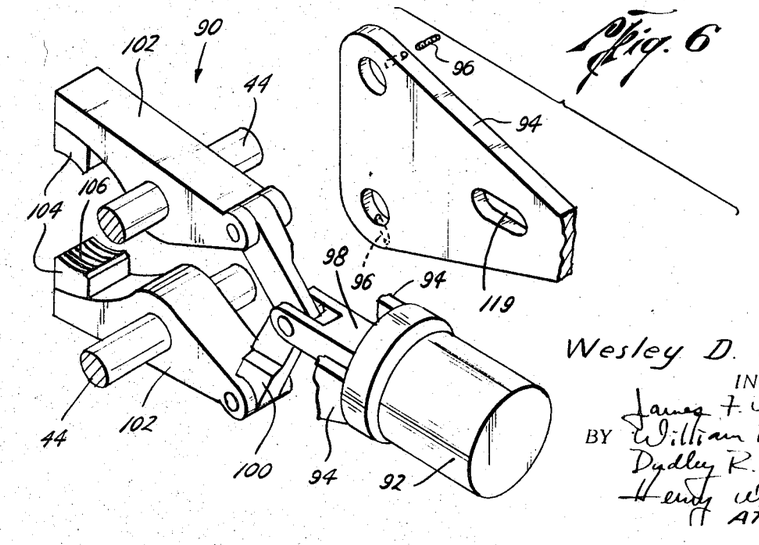
FIG. 6 is an exploded, perspective view of the indexing cam means.

Returning to FIGS. 2, 4 and 6 the index clamping means generally indicated by the numeral 90 will be discussed. This clamping means is comprised of a pneumatic cylinder 92 having extended outwardly therefrom end plates 94. These plates 94 are fixed to the rods 44 by pins 96. Rotatably connected to the outermost end of piston rod 98 are link members 100. Connected to their outermost ends, also in a rotatable manner, are clamping members 102. The free ends of these clamp members 102 carry clamping jaws 104 having in their faces threads 106 of equal pitch to the lead screw. The clamp members 102 are freely rotatable about their rods 44 but are maintained in proper position thereon by the two fixed, end plates 94.

Also acting on the lead screw is stationary clamp means 110. This clamp means is constructed essentially the same as the indexing clamp means 90 with the following exceptions. The clamp means 110 is supported by the angle brackets 112, which are secured to the table 22 between which angle bracket rods 114 extend. As will be seen, therefore, the clamp means 112 is not stationary relative to the frame 14. It is, however, stationary relative to the table 22, whereas the index clamp means 90 is movable relative to the table. For this reason, the clamp means 110 will be referred to herein, as well as in the claims, as "stationary clamp means" for ease of identification. The clamping members 116 are rotatably mounted on these rods 114, and the clamping jaws have threaded faces as did the clamp members 104 of the indexing clamping means. The pneumatic cylinder 118 for the stationary clamp means is shown in section in FIG. 4. As was pointed out previously, the stationary clamp means is fixedly attached to the table 22, whereas the index clamp means is fixedly attached to the rods 44 which are slidable relative to the table 22. In FIG. 4, the stationary clamp means is clamped to the lead screw 20, and the index clamp means 90 is open. If desired, slots 119 may be located in the end plates 94 and the angle brackets 112 through which the pivot pin for the link members 100 may extend to maintain this assembly in proper position as the piston rods reciprocate. This also aids in the assembly and repair of these parts.

Figure 7:
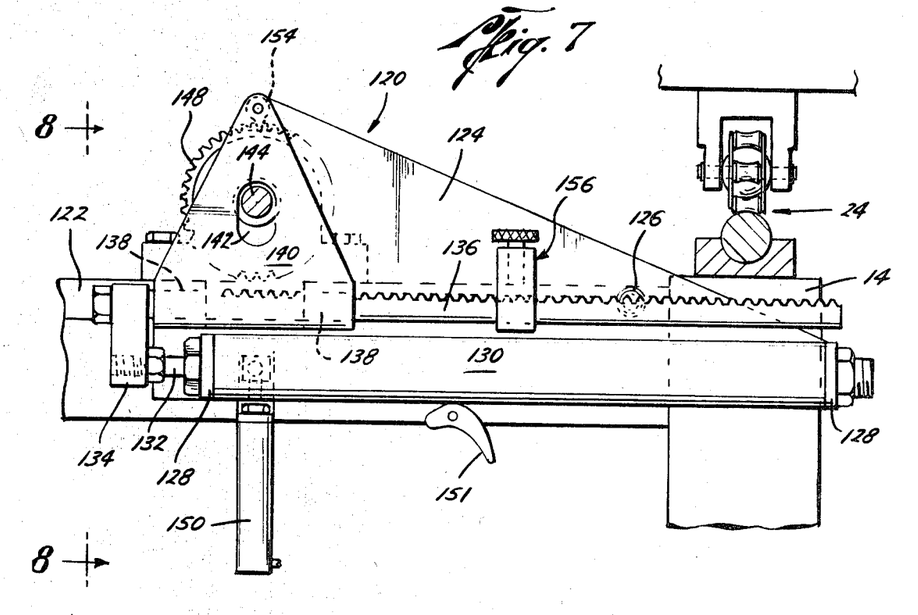
FIG. 7 is a side view of the secondary indexing means.
Figure 8:
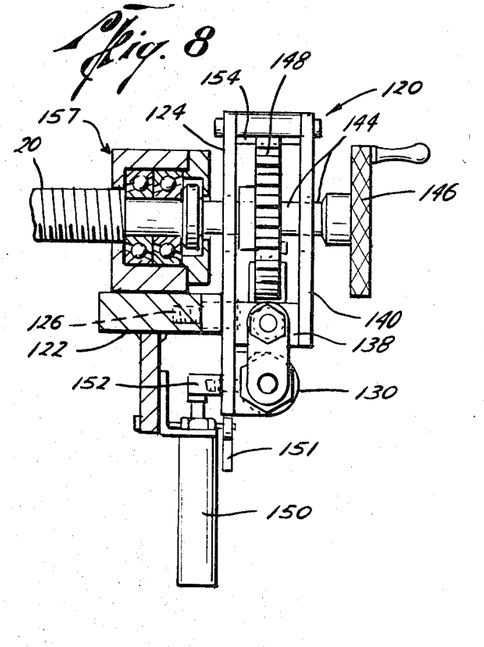
FIG. 8 is an end view of the apparatus shown in FIG. 7, as seen along lines 8—8 of FIG. 7.

Turning now to FIGS. 7 and 8, the secondary indexing assembly 120 will be discussed. This assembly is positioned at the far end and below the table 22 as viewed in FIG. 1. It is fixedly secured to the frame 14 by means of the T-shaped support member 122. The top of the frame 14 and the single way 24 is shown in FIG. 7 along with the lead screw 20 to give the approximate position of the secondary indexing assembly.

This secondary index means is comprised of a first triangular shaped plate 124 pivotally mounted about the pin 126. Flanges 128 extend outwardly from the plate 124 and support from either end the secondary cylinder 130. The piston rod 132 is attached by a plate 134 to a rack 136. This rack is slidably supported in bushing members 138 which extend between and connect a plate 140 to the plate 124. The plate 140 and plate 124 have elongate openings 142 through which an end 144 of the lead screw 20 extends. Attached to the outermost end of this shaft 144 is the manually operated handle 146. Secured to this shaft 144 for rotation therewith is the toothed gear 148. Radial thrust-bearing members, generally indicated at 157 are provided at this end of the lead screw 20 for rotation with it as are like bearing members located at the opposite end of the lead screw (see FIG. 1).

A cam lever 151 (see FIG. 7) is rotatably mounted on the support 122 to raise by hand the apparatus pivoted about pin 126. The lever, however, raises this apparatus only far enough to disengage the tooth 154 but not enough to engage the rack and the gear. This allows rotation of the lead screw by the hand wheel 146.

In the positions shown in FIGS. 7 and 8, the teeth of the rack 136 lie below and do not engage the teeth of the gear 148. To move the rack upwardly, so as to engage the gear 148, an engaging cylinder 150 is mounted to the T-shape support member 122, and its piston rod is connected at 152 to the plate 124. Accordingly, actuation of the cylinder 150 to extend its piston rod will rotate the plate 124 and the assembly carried by this plate in a clockwise direction about the pivot 126.

Also extending between the plates 124 and 140 is a locking tooth 154. In the position shown in FIG. 7, this tooth is engaged with the gear 148. When the plate 124 is raised as previously described, however, the tooth 154 will move out of engagement with the gear 148.

The length of the rack 136 in this embodiment equals or exceeds the circumference of the gear 148. In like manner, the teeth carried by the rack 136 also equals in pitch and equals or exceeds in number the teeth of the gear 148. An adjustable stop or stroke adjustment means is carried by the rack 136 and is generally indicated by the numeral 156. This stop means is comprised of a housing 158 mounted about the rack with a locking lug 160 contained therein and mounted on a knob 162 which is threaded to the housing 158. Accordingly, rotation of the knob 162 will either raise or lower the lug 160 out of or into engagement with the rack 136.

Figure 10:
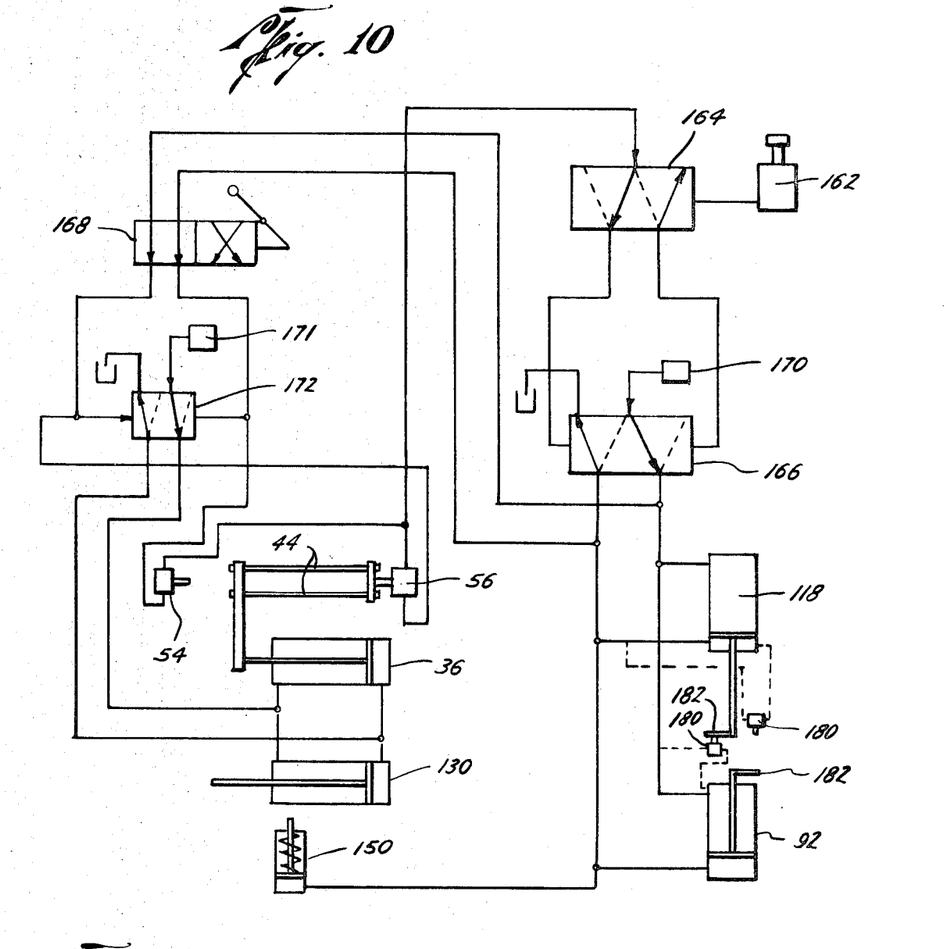
FIG. 10 is a schematic view of the pneumatic control means in its null position.
Figure 11:
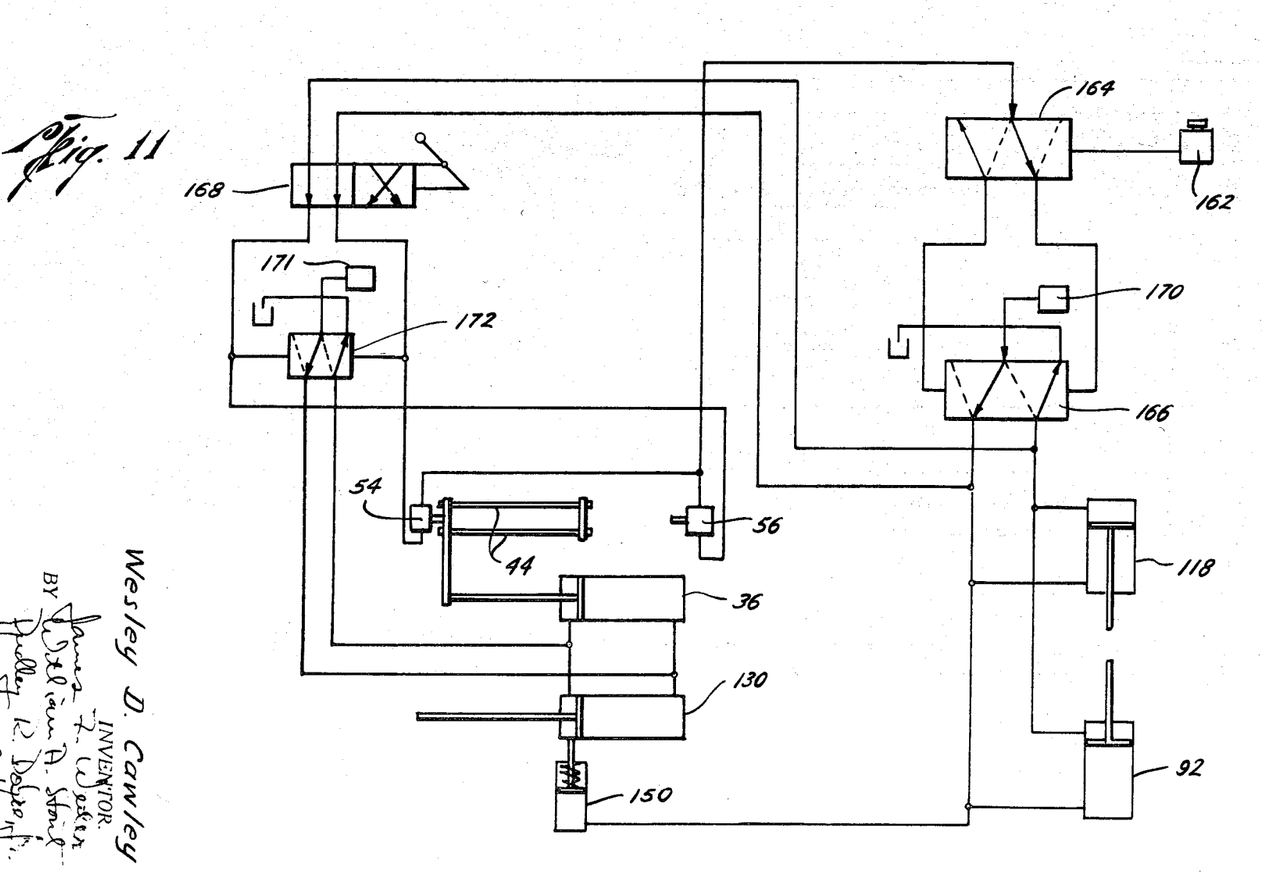
FIG. 11 is a schematic view of the pneumatic control means in its activated position.
Figure 12:
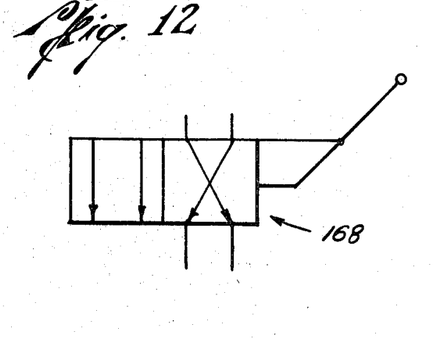
FIG. 12 is a schematic view of the switch-over valve utilized in the pneumatic control means.

FIGS. 10, 11 and 12 disclose in schematic fashion the pneumatic control system used to actuate and control the previously described indexing apparatus. Before going on, however, we will at this time describe the operation of the elements that have been hereinbefore listed.

Returning now to FIG. 1, and assuming that the work piece has been properly secured to the table 22, the drill of the press is positioned with regard to the line along which the series of operations are to take place. This line is parallel, of course, to the lead screw 20, and thus, parallel to the path of travel along which the table 22 moves as determined by the ways 24. The operator positions the work piece for the first position. He has previously determined how far the table must travel to bring the next and subsequent locations under the drill bit and has set the indexing apparatus as follows:

The handle 82 of the cam apparatus is rotated to lower the plate 74, thereby freeing the adjustment rod 62. Since the right-handmost position of the indexing clamp 90 is always the same, the operator can determine how far on the lead screw the cylinder must advance. Knowing the pitch of the threads on the screw, and since the threads on the adjustment rod 62 equal in pitch the threads on the lead screw 20, he can adjust the limit valve 54 accordingly by sliding the rod 62 in or out of the passageway 66. This is, of course, best accomplished by the provision of indicia on the side of the adjustment rod 62 to be used in cooperation with the outermost edge of the plate 74 on the cam apparatus. Such a handy visual reference will make the adjustment to the desired indexing distance a relatively simple matter. After adjustment, the handle 82 is returned to its original position, locking the rod 62.

Throughout this time, the stationary clamping means 110 has been securely clamped about the lead screw 20. This will prevent any inadvertent and undesirable movement of the table while work is being performed. Following the setting of the adjustable limit valve 54, the pneumatic control system (to be described below) is actuated which will cause the primary cylinder 36 to extend its piston rod. Simultaneously, the cylinder 118 is actuated to retract its piston rod, thereby opening the stationary clamp means or jaws. In addition, the cylinder 92 is also actuated to extend its piston rod thereby clamping the index clamp jaws about the lead screw. Sufficient lag in the control system may be provided so that the index clamp jaws are securely fastened to the lead screw and the stationary jaws are released therefrom before the primary cylinder begins to extend its piston rod 40.

Looking now at FIG. 2, as the rod 40 begins to extend, it will urge the rods 44 to slide through the angle brackets 38 and 46. These rods 44 are, however, keyed to the end plates 94 of the index clamp means, which is, in turn, securely clamped to the lead screw. Thus movement of the rods and index clamp means relative to the lead screw is prevented. The result is movement by the pneumatic cylinder to the right as viewed in FIG. 2. Since this cylinder is secured to the table 22 by the angle bracket 38, the table will also move to the right as will the attached limit valve 54 and its associated shock absorber 58. Eventually, the piston rod plate 42 will contact the extended rod of the shock absorber 58 which will begin to slow the moving parts to a gradual and gentle halt. As it comes to a halt, the pin 50 on the piston rod plate 42 will contact the limit valve 54.

Actuation of the limit valve 54 will reverse the pneumatic control system bringing about the following results. The index clamping means 90 will release the lead screw, and the stationary clamp means 110 will again clamp securely on it. Thus the table is secured for performance of the work. The primary cylinder 36 will retract its piston rod 40. Since the index clamping means 90 has now released the stationary lead screw, the rods 44 and attached clamping means 90 will slide relative to the table to return to the position shown in FIG. 2. As previously pointed out they will return to the same right-handmost position due either to the contact with the index clamp means 90 and the angle bracket 46, the contact of the plate 48 with the limit valve 56 and shock absorbers 60 or due to the limit to which the cylinder 36 can retract its piston rod 40. Thus the assembly is now in position to index the table to the next subsequent position for the work piece.

Figure 9:
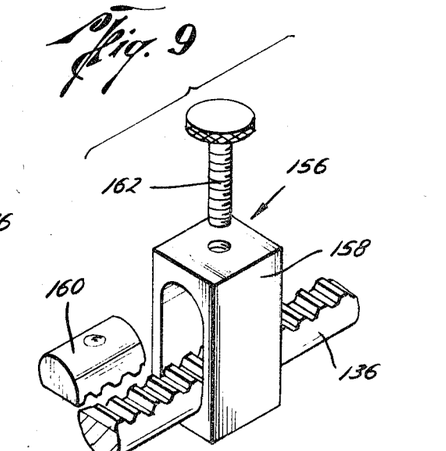
FIG. 9 is a partially exploded, perspective view of the adjustable stop means used on the secondary indexing apparatus.

As can be seen, therefore, the primary system alone will index the work table throughout a distance determined only by the pitch of the threads on the lead screw 20. Thus, if the lead screw is a 16 pitch screw, the primary system can index for distances with an accuracy of .062 inch. Utilization of the secondary indexing system shown in FIGS. 7, 8 and 9, however, can provide much greater accuracies as will now be explained.

When one wishes to index for greater accuracies than is provided by the primary system alone, the index stroke of the primary system is set to the thread on the lead screw which is the closest to the desired indexing distance, but which does not exceed the desired distance. Since the index clamp means 90, which is the clamp means connected to the lead screw during the indexing operation, is threadedly engaged with the lead screw, rotation of the lead screw will cause the index clamp means to translate along the lead screw. Along with the index clamp means, of course, will move the primary cylinder 36, and in turn, the table 22. As one will readily understand, a full rotation of the lead screw is required to move the index clamp means a distance equal to the distance between two adjacent threads on the lead screw. Accordingly, a partial rotation of the lead screw will bring about only a very minute movement of the index clamp means and the connected work table.

With this in mind, the operator determines what degree of rotation for the gear 148 will bring about the additional, linear adjustment required of the work table. Having determined this, the adjustable stop or stroke adjustment means 156 on the rack 136 is set at the point on the rack which will allow it to rotate the gear 148 the desired amount and no more. As with the adjustment bar 62, appropriate indicia may be provided on the rack 136 and tables may be previously calculated and supplied to the operator converting the positions on the rack 136 (as well as rod 62) to the desired increment of movement of the table.

Having set the stop means 156, and assuming that the indexing operation is ready to begin, the pneumatic control system is actuated. The sequence of operations that have been previously described for the primary index system will again take place. Simultaneously therewith, the engaging cylinder 150 will extend its piston rod, causing the plate 124 and elements carried thereon to pivot about the pin 126. The cylinder 150 will extend until the rack 136 engages the gear 148. This will stop the extension of the cylinder and at the same time remove the locking tooth 154 from engagement with the gear 148. The secondary cylinder 130 will then begin to extend its piston rod 132 which is connected to the rack. This will cause rotation of the gear until the adjustable stop 156 contacts the nearest bushing 138. This will prevent further extension of the secondary cylinder piston rod and further rotation of the gear 148.

Thus, as the index clamping means 90 and primary cylinder 36 has caused the table to move the primary indexing distance, the rotation of the gear 148 will result in an additional increment of movement of the table 22. At the end of the indexing operation or step, the pneumatic control means releases the engaging cylinder 150 and allows it to retract its rod. In the preferred embodiment of the present invention, a spring biased cylinder is utilized for the engaging cylinder (see FIGS. 10 and 11), thereby requiring positive actuation thereof in only one direction. The retraction by the cylinder 150 will, once again, lower the rack out of engagement with the gear 148, and the locking tooth 154, into engagement. At this point, the secondary cylinder will retract its piston rod to its original position, ready to begin the next indexing step. The table is securely held in position by the stationary clamp means 110 securely clamped to the lead screw and by the locking tooth 154 preventing any rotation of the lead screw.

Thus an extremely accurate indexing of the table can be achieved with use of the primary and secondary indexing systems disclosed herein. By way of example, with a 16 pitch lead screw and a gear 148 having 125 teeth, a resolution of .0005 inch can be easily obtained. Accordingly, it would always be possible to be within .00025 inch of any desired index. It should be noted that where indexing by the primary system alone is sufficient, the stop means 156 may be placed against the bushing 138 to prevent any indexing by the secondary cylinder.

Turning now to FIGS. 10, 11 and 12, a preferred embodiment of the pneumatic control system will be described. This system is comprised of a bleed button valve 162 positioned for actuation by the operator of the machine. It is connected to a 4-way pilot valve 164, the opposite sides of which are connected to the pilot ports of another 4-way pilot valve 166. A source 170 of actuating fluid, for example compressed air, feeds into the valve 166. The opposite sides of the valve 166 are connected as shown to the clamping means actuating cylinders 92 and 118 such that when one extends its piston rod, or closes its clamping jaws, the other retracts, or opens its jaws.

The opposite sides of the valve 166 are also connected through a manually operated switch-over valve 168 to the pilot ports of yet another 4-way pilot valve 172. Another actuating fluid source 171 is fed into the valve 172 and from there into the opposite ends of the primary cylinder 36 and secondary cylinder 130. These are in parallel so that when one extends, the other also extends. The engaging cylinder 150 is also connected to the 4-way pilot valve 166, as shown.

The opposite sides of the valve 166 are also connected through the manual valve 168 to the limit valves 54 and 56 as shown. A common line leading from both limit valves supplies compressed air to the first mentioned 4-way pilot valve 164.

The position of the valves and cylinders shown in FIG. 10 is the "null" position of the pneumatic control system. In this position, the stationary clamping means is clamped about the lead screw, the indexing clamping means is open and the cylinders are stationary. When the operator wishes to index the table, he presses the button valve 162 to bleed pressure from the valve chamber of the valve 164. This causes the spool to shift so that the ports are aligned as shown in FIG. 11. Thus compressed air is fed to the right side of the spool of the valve 166 causing its spool to shift to align the ports as also shown in FIG. 11. Compressed air from the source 170 is then fed to the retract side of the stationary clamp cylinder 118, thereby opening the stationary clamp jaws. This actuating fluid is also fed to the cylinder 92 to close the index clamp means and at the same time to the engaging cylinder 150, thereby extending its piston rod to engage the rack 136 with the gear 148.

Actuating fluid also flows from valve 166 through valve 168 and into the right-hand port of valve 172, causing the valve to shift, as shown in FIG. 11, thereby feeding the actuating fluid from the source 171 to the extend side of the primary and secondary cylinders 36 and 130. This causes the primary cylinder to move (since the index clamp jaws have previously been secured to the lead screw and the stationary jaws released), and the table to index. The extension of the secondary cylinder will rotate the lead screw as previously described for the fine adjustment of the table.

The compressed air supplied to the first valve 164 is always present during the null position of the control system due to the fact that the primary piston rod means will be in constant contact with the limit valve 56. This allows compressed air to flow from the source 170 to the valve 164. The valve 164 is normally biased into the position shown in FIG. 10 so that during the null position (whenever the manual button 162 is not depressed to bleed pressure from the valve chatmber of the valve cylinders will be actuated as shown in FIG. 10, whereby no movement of the table will take place and it will be securely locked in position.

In the operation of this embodiment, there is an instant between the release of the lead screw by one clamping means and the gripping of it by another. For this brief moment, therefore, the work table is free to move. Ordinarily, this is no problem due to the stability and weight of the table and attached work piece. If it is desired to insure against any inadvertent movement during this time, however, the arrangement shown in broken lines in FIG. 10 may be utilized.

This arrangement merely incorporates limit valves 180 placed adjacent the clamping means and outstanding contact lugs 182 on the piston rods of the cylinders 92 and 118. These valves 180 and their connecting lines are used to connect the source 170 to the retract side of the pistons in place of the lines shown in solid. Thus, they control the flow of actuating fluid to the side of the pistons which allows its respective clamping means to release. Since no fluid can move through either of the limit valves until it is contacted by the lug 182 on the other clamping means, its clamping means cannot retract and release until the other clamping means is extended and clamped. This alternative arrangement insures that the table is at all times secured.

Provision is also made in the present invention to allow indexing of the table in both directions along the ways 24 by means of the manually operated valve 168. Assuming one has indexed the work piece from left to right as viewed in FIG. 1, and now desires to perform the same or a different series of operations from right to left, he again positions the bit along the desired line of path. He then switches position of the manual valve 168 to that shown in FIG. 12. This reverses the flow of actuating fluid moving to the valve 172, the primary and secondary cylinders and the limit valves 54 and 56. The control system will, in all probability, be in its null position when this takes place.

This change in the valve 168 will bring about the flow of compressed air from valve 166 to the right port of valve 172 causing this valve to shift to its position shown in FIG. 11. This will cause the cylinders 36 and 130 to shift to their extended positions or those shown in FIG. 11. No change will take place in the index and stationary clamping cylinders 92 and 118 or in the engaging cylinder 150. The only change will be in the primary and secondary cylinders.

Accordingly, when the control system is in its null position, the piston rods of these cylinders will be extended. When the system is in its actuated position, or that shown in FIG. 11, the cylinders will retract rather than extend, thereby causing the work table to index to the left rather than to the right. The rotation of the lead screw by the secondary cylinder will be in the opposite direction of that previously described. The stationary and index clamp means will open and close as before. In summary, therefore, all of these systems will operate as before, but the actuation of the primary and secondary cylinders will merely be in reverse of that previously described, causing the table to move in the opposite direction.

The provision of the manual valve or a similar valve 168 will eliminate a great amount of set-up and return time required by the operator. He may index over on one line performing a set of operations and then index back performing the next set of operations. In the alternative, he may index over performing one set of operations and index back on the next line along which the same operations are to be performed.

As can be seen, therefore, the present invention achieves the objectives set forth at the outset. A pneumatic-mechanical linear index system has been devised which is relatively simple as compared with other such apparatus and which provides for ease of manufacture, operation and maintenance. The relative simplicity of the system provides for greater dependability, as well as lower initial cost and decreased upkeep. No relatively complicated programming or other procedures are needed to operate the present invention, the operator being able to set the distance to be indexed into the machine in a matter of moments.

In addition to its simplicity, the persent invention provides very accurate indexing of a work supporting table and allows indexing in both directions along a linear path of travel. Because of its simplicity of parts and the type of equipment used, it will provide a long and trouble free life even under heavy-duty use. Because the lead screw is used primarily as a pull bar rather than as a screw, wear on the lead screw is negligible, and it will maintain high accuracies over a much longer period of time than would a conventional system. Furthermore, since the lead screw is clamped securely and the toggle system is self-compensating for wear, there is no backlash.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, shape, size and arrangement of parts may be resorted to without departing from the spirit and scope of the invention as hereinafter claimed:

What is claimed is:
1. Apparatus for indexing a table including:
a table slidably mounted on a frame;
a primary cylinder fixedly secured to the table and including,
piston rod means having reciprocal instroke-outstroke movement;
stationary clamp means secured to the table and being normally clamped to a portion of the frame for preventing movement of the table relative to the frame;
noramlly open index clamp means for clamping to said frame portion, slidable relative to the table and secured to the primary cylinder piston rod means;
pneumatic control means normally being in a null position, wherein the primary cylinder is actuated to retract its piston rod means the stationary and index clamp means are in their normally closed and open positions, respectively, but said pneumatic control means being operatively connected to said primary cylinder, stationary clamp means and index clamp means for releasing the stationary clamp means, clamping the index clamp means on said frame portion and actuating the primary cylinder to extend its piston rod means when the control means is activated; and
a valve connected to the pneumatic control means for the activation thereof.
2. The invention of claim 1 and including,
stop means in the path of travel of the piston rod means for returning the pneumatic control means to its null position when contacted by the piston rod means.

3. The invention of claim 2 wherein the stop means is defined as,
   a first limit valve operatively connected to the pneumatic control means and positioned in the path of travel of the piston rod means' outstorke movement.

4. The invention of claim 3, and including,
   a second limit valve in the path of travel of the instroke movement of the piston rod means, and
   switch-over valve means operatively connected to the primary cylinder for reversing the instroke and outstroke movements made by the piston rod means in response to the null or activated position of the pneumatic control means, whereby the primary cylinder is normally actuated to extend its piston rod means.

5. The invention of claim 4 wherein,
   said first limit valve is adjustable along the path of travel of the piston rod means, whereby the length of the instoke-outstroke movements of the piston rod means may be adjusted.

6. The invention of claim 5 wherein,
   said frame portion is comprised of, a lead screw extending substantially parallel to the movement of the table; and
   the stationary and index clamp means have threaded clamping jaws, whereby they threadingly engage the lead screw when clamped thereto, thus rotation of the lead screw will cause the index and stationary clamp means that is clamped thereto to translate along said lead screw; and including,
   manually operated means for rotating the lead screw.

7. The invention of claim 6 and including,
   shock absorbers adjacent each of the limit valves for contacting the piston rod means to bring the table to a gradual halt.

8. The invention of claim 1 wherein:
   said frame portion is comprised of, a lead screw extending substantially parallel to the movement of the table; and
   the stationary and index clamp means have threaded clamping jaws, whereby they threadedly engage the lead screw when clamped thereto, thus rotation of the lead screw will cause the index and stationary clamp means that is clamped thereto to translate along said lead screw.

9. The invention of claim 8 including:
   a secondary cylinder mounted on said frame substantially perpendicular to the lead screw, having
   a reciprocal piston rod for instroke-outstroke movement;
   a toothed gear fixed to the lead screw for rotation therewith;
   a rack with teeth engaging the teeth of said gear and being connected to, for sliding movement with, the piston rod of the secondary cylinder; and
   stroke adjustment means on the rack for selectively limiting the distance that the secondary cylinder piston rod can extend.

10. The invention of claim 9 wherein,
    the pneumatic control means is operatively connected to the secondary cylinder for extending its piston rod when said control means is activated, the secondary cylinder being actuated to its retracted position when the pneumatic control means is in its null position, and including
    means for preventing rotation of the lead screw during the retraction of the secondary cylinder piston rod.

11. The invention of claim 10 wherein, the means for preventing rotation of the lead screw is further defined as including,
    means for moving the rack out of engagement with the gear when the pneumatic control means is in its null position.

12. The invention of claim 11 wherein said last mentioned means includes,
    said rack and secondary cylinder being pivotally mounted for movement of the rack into and out of engagement with the gear,
    an engaging cylinder with a reciprocal piston rod mounted on the frame and operatively connected to, for control by, the pneumatic control means,
    the engaging cylinder piston rod being operatively connected to the rack and secondary cylinder for movement of the rack into engagement with the gear by extension of the piston rod, the engaging cylinder being actuated to its retracted position when the pneumatic system is in its null position and being actuated to its exhausted position when the pneumatic control means is activated.

13. The invention of claim 6 including:
    a plate rotatably mounted on said frame;
    a secondary cylinder mounted on said plate generally perpendicular to the lead screw;
    a reciprocal piston rod carried by said secondary cylinder for instroke-outstroke movement;
    a toothed gear fixed to the lead screw;
    a rack with teeth mounted on said plate and connected to the secondary cylinder piston rod for sliding movement therewith; and
    stroke adjustment means on the rack for selectively limiting the distance that the secondary cylinder piston rod can extend.

14. The invention of claim 13 wherein,
    the pneumatic control means is operatively connected to the secondary cylinder for extending its piston rod when said control means is activated, the secondary cylinder being actuated to its retracted position when the pneumatic control means is in its null position, and including
    means for preventing rotation of the lead screw during the retraction of the secondary cylinder piston rod.

15. The invention of claim 14 wherein,
    the means for preventing rotation of the lead screw is further defined as including,
    means for moving the rack out of engagement with the gear when the pneumatic control means is in its null position.

16. The invention of claim 15 wherein said last mentioned means includes,
    said rack and secondary cylinder being pivotally mounted for movement of the rack into and out of engagement with the gear.
    an engaging cylinder with a reciprocal piston rod mounted on the frame and operatively connected to, for control by, the pneumatic control means,
    the engaging cylinder piston rod being operatively connected to the rack and secondary cylinder for movement of the rack into engagement with the gear by extension of the piston rod, the engaging cylinder being actuated to its retracted position when the pneumatic system is in its null position and being actuated to its extended position when the pneumatic control means is activated.

17. The invention of claim 16 wherein,
    said switch-over valve means is also operatively connected to the secondary cylinder for selectively reversing the actuation thereof by the pneumatic control means, whereby both the primary and secondary cylinders may be actuated to their extended positions when the pneumatic control means is in its null position and to the retracted positions upon activation of the pneumatic control means.

18. The invention of claim 17 wherein the stroke adjustment means is further defined as including, a housing member through which the rack slides, an adjustable stop on the rack for clamping at selected positions on the rack, whereby the stop will contact said housing member and prevent further movement by the rack, and accordingly, further rotative movement of said gear and lead screw.

19. The invention of claim 18 and including, a locking tooth normally engaged with said gear to prevent rotation thereof, and means for disengaging the locking tooth from the gear.

20. The invention of claim 19 wherein said disengaging means is defined as, said locking tooth being connected to the engaging cylinder's piston rod for movement away from the gear when the engaging cylinder's piston rod for movement is actuated.

21. Apparatus for indexing a table comprising:

a table slidably mounted on a frame;

a primary cylinder fixedly secured to the table and including, a piston rod means having reciprocal instroke-outstroke movement;

a lead screw secured to the frame for rotative movement and extending parallel to the desired path of travel of said table;

stationary clamp means secured to the table and having threaded clamping members normally clamped to said lead screw for preventing movement of the table relative to the frame;

normally open index clamp means slidable relative to the table having threaded clamp members for clamping to said lead screw and being secured to the primary piston rod means;

a gear on said lead screw having teeth about its periphery;

a rack having teeth equal in pitch but exceeding in number the teeth of said gear;

a secondary pneumatic cylinder having a piston rod for reciprocating instroke-outstroke movement, said rack being connected to, for movement with, said secondary cylinder piston rod;

stroke adjustment means on said rack for selectively determining the length of the movement of said rack;

a plate being pivotally mounted on said frame adjacent said gear, said secondary cylinder and rack being mounted on said plate;

an engaging cylinder on said frame and including a piston rod connected to said plate, the extension of said engaging cylinder piston rod bringing said rack into engagement with said gear;

a locking tooth on the plate and normally being engaged in said gear to prevent rotation thereof, the movement of said rack into engagement with said gear moving said locking tooth out of engagement with said gear;

manually operated means for rotating the lead screw;

pneumatic control means normally being in a null position, wherein the primary cylinder is actuated to retract its piston rod means, the secondary and engaging cylinders are actuated to retract their piston rods, and the stationary and index clamp means are in their normally closed and open position, respectively, but said pneumatic control means being operatively connected to said primary secondary and engaging cylinders, stationary clamp means and index clamp means for releasing the stationary clamp means, clamping the index clamp means on said lead screw and actuating the primary, secondary and engaging cylinders to extend their piston rod means and piston rods, respectively, when the control means is activated;

a manually operated switch connected to the pneumatic control means for the activation thereof; and limit valve means connected to the pneumatic control means and positioned at each end of the path of travel of the piston rod means for returning the pneumatic control means to its null position upon contact of one of said limit valve means with said piston rod means, the limit valve means positioned at the end of the outstroke of the piston rod means being adjustable along the path of travel of said piston rod means.

22. The invention of claim 21 wherein the pneumatic control means is further defined as including, switch-over valve means operatively connected to the primary and secondary cylinders for reversing the instroke-outstroke movements made by their piston rod means and piston rod, respectively, in response to actuation of said cylinders by the pneumatic control means, whereby the primary and secondary cylinders are actuated to extend their piston rod means and piston rod, respectively, when the pneumatic control means is in its null position, and to retract same when the pneumatic control means is activated.

References Cited

UNITED STATES PATENTS 2,068,199  1/1937  Seletsky ______________ 77—63

FRANCIS S. HUSAR, Primary Examiner

U.S. Cl. X.R.

77—32.2